United States Patent [19]

Alex

[11] Patent Number: 5,765,795
[45] Date of Patent: Jun. 16, 1998

[54] DEFORMABLE COMPUTER MOUSE PAD

[76] Inventor: Paul J. Alex. 5672 Middlecoff Dr.. Huntington Beach. Calif. 92649

[21] Appl. No.: 559,689

[22] Filed: Nov. 15, 1995

[51] Int. Cl.$^6$ ................................................ A47B 91/00
[52] U.S. Cl. ................................................ 248/346.1
[58] Field of Search .......................... 248/346.1, 918; 108/43; 400/715

[56] References Cited

U.S. PATENT DOCUMENTS

| | | | |
|---|---|---|---|
| 5,217,781 | 6/1993 | Kuipers | 428/85 |
| 5,340,075 | 8/1994 | Schriner | 248/118 X |
| 5,355,811 | 10/1994 | Brewer | 108/43 |
| 5,556,061 | 9/1996 | Dickie | 248/346.01 |

*Primary Examiner*—Ramon O. Ramirez
*Attorney, Agent, or Firm*—Leonard Tachner

[57] ABSTRACT

A reconfigurable computer mouse pad is disclosed as comprising a pair of adhesively attached mouse pad material surfaces having mounted therebetween a plurality of plumber strips, the latter comprising elongated, rectangular strips of metal typically made of an aluminum alloy. The combination of mouse pad surfaces and the plumbers' strips sandwiched between them, results in a novel structure of a readily configurable computer mouse pad apparatus which permits the pad to be bent into virtually any desired configuration, including for example, an arched configuration suitable for being mounted on the arm of a chair or on the thigh of a user. The most significant aspect of the present invention is that it comprises a mouse pad that can be configured into any shape and because of the construction thereof, will retain that shape.

6 Claims, 2 Drawing Sheets

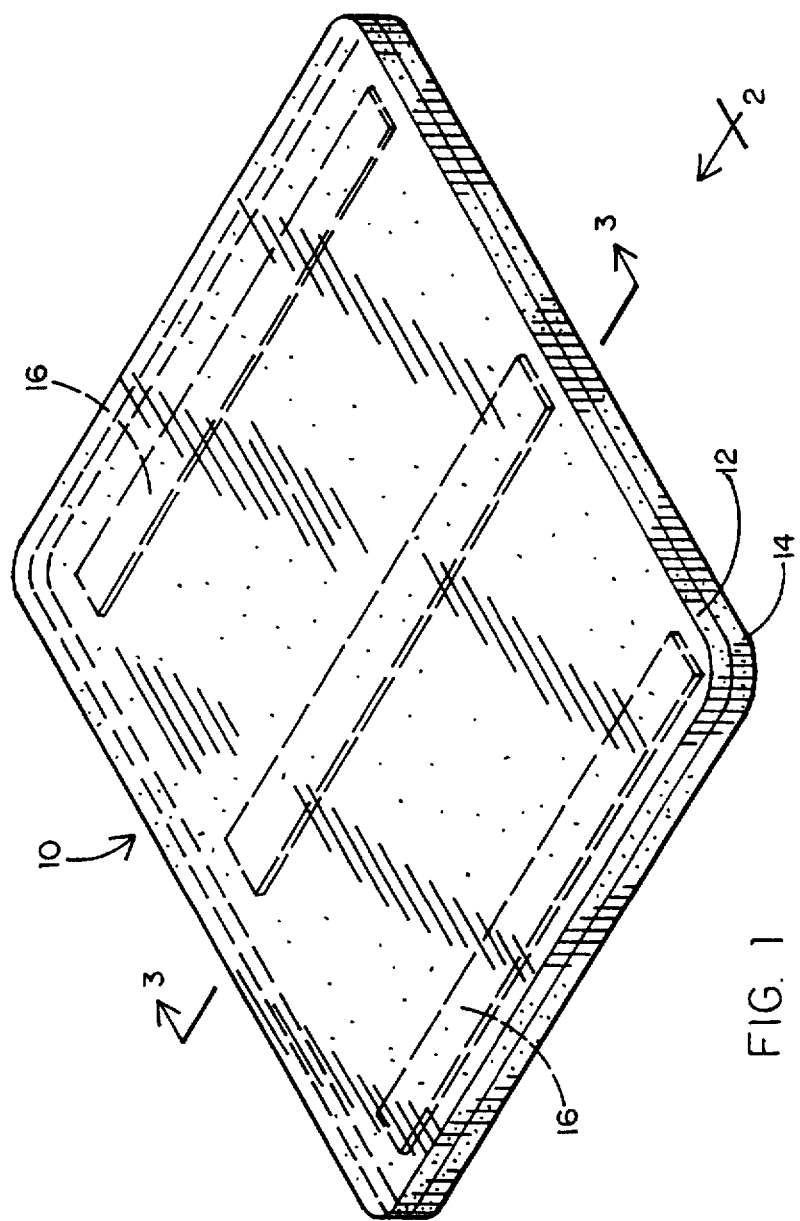
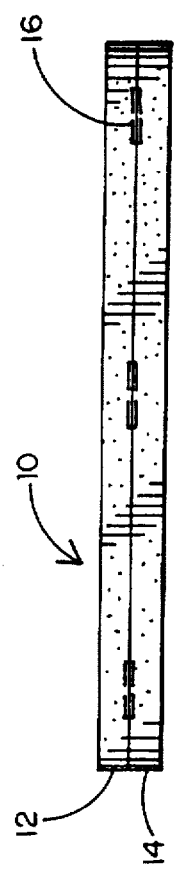
FIG. 1
FIG. 2

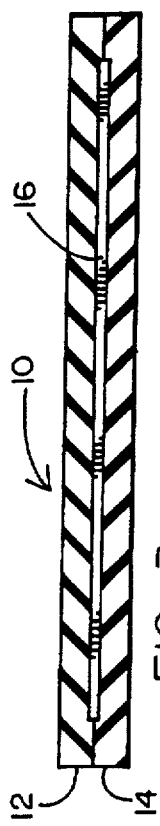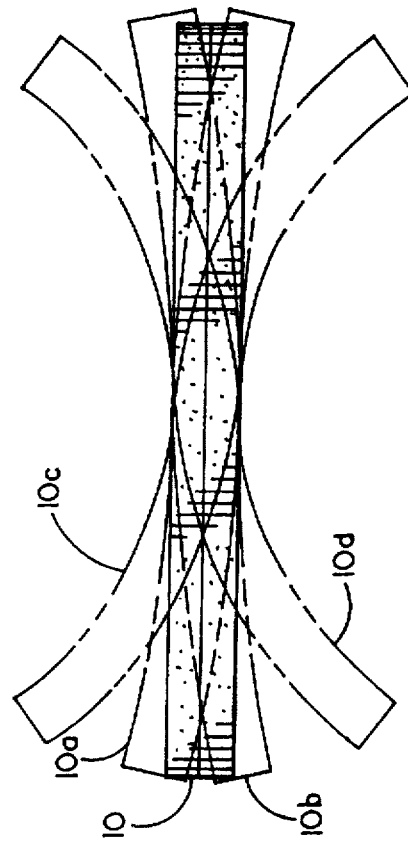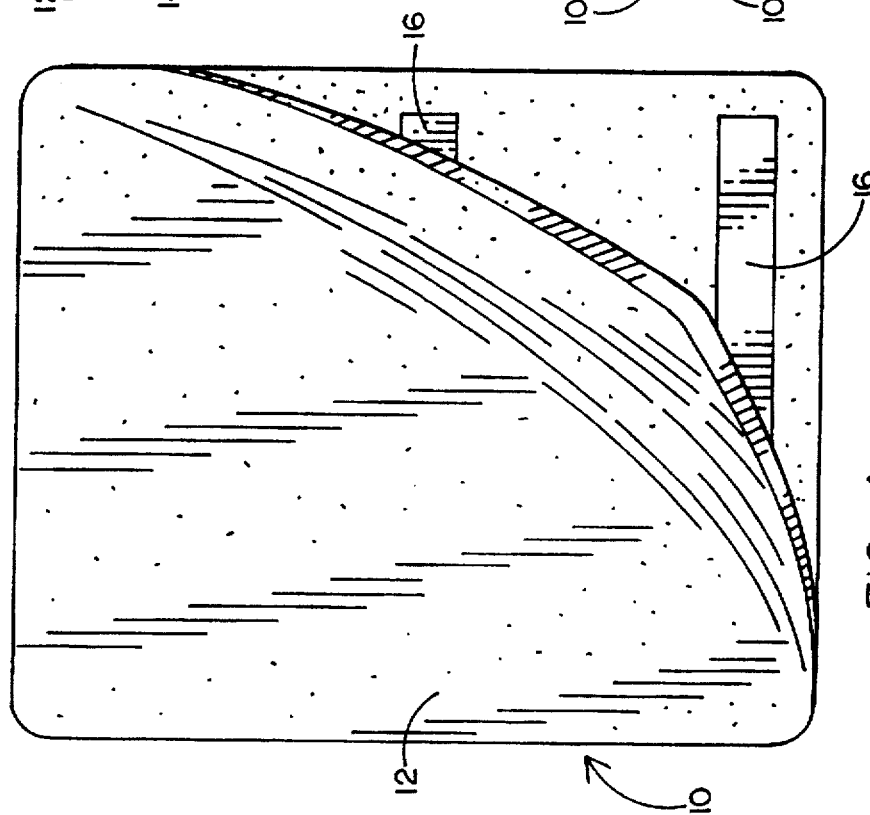

DEFORMABLE COMPUTER MOUSE PAD

BACKGROUND OF THE INVENTION

1. Field of the Invention

The present invention is directed to office devices for increasing the comfort of using a computer mouse and in particular to devices for increasing wrist, hand and shoulder comfort in using a computer mouse.

2. Prior Art

A computer mouse is a hand-held device normally operated on a flat surface which, in cooperation with the appropriate computer hardware and software, permits a computer user to control the movement of a cursor or pointer located on a computer display. Typically, a computer mouse includes a generally mound-like body to be grasped by the user and further includes a cable or other device connecting the mouse to the computer. The underside of the mouse housing typically includes a rollerball which is connected electronically by means of the control cable to a cursor or display pointer located on a video display associated with the computer. A typical computer mouse further includes one or more activation buttons.

If the user of the mouse desires to move the display pointer or cursor to the upper left-hand corner of the display, the user orients the mouse on the flat operating surface and pushes the mouse in the direction of the upper left corner of the display while watching the display. The cursor changes its position to correspond to the relative change in the position of the mouse. Thus, the user can guide the cursor to any position on the display by the use of the mouse.

The use of a computer mouse greatly enhances the speed and ease of inputting commands to a computer and facilitates much faster data entry than that provided by keyboard useage. While computer mice are capable of achieving high resolutions, the work surfaces upon which mice operate can have a profound impact on the resolution and efficiency of the mouse.

Recently, there has also been enhanced interest in creating computer equipment and devices which are ergonomic. Ergonomic devices are devices designed to contour to the human body and to facilitate user comfort. The interest in ergonomic devices has been fueled by the increased interest in the medical risks associated with extended computer useage. Among the most serious risks imposed by extending keyboard useage for axample is Carpal Tunnel Syndrome, a painful and debilitating condition which affects the user's hands and wrists. Permitting a user's palms or wrists to rest comfortably while using a computer has been found to increase productivity and decrease related physical ailments such as Carpal Tunnel Syndrome.

The prior art has recognized the problem of user comfort in regard to the operation of a computer mouse. By way of example, U.S. Pat. No. 4,862,165 to Gart, entitled Ergonomically Shaped Hand Controller, describes the external configuration of a particular shaped mouse which is designed to reduce the stress and discomfort resulting from protracted use of a computer mouse.

U.S. Pat. No. 5,340,075 to Schriner is directed to an ergonomic mouse pad. Referring to the Figures, mouse pad 10 comprises a substantially flat pad 12 having a polymeric top surface 14 for supporting a computer mouse 18. Pad 10 further comprises a four-sided structure having three substantially vertical sidewalls 24, 24a, 24b proximate to each side, and a fourth smaller wall 24c. This reference states that pad 10 may have more or fewer than four sides and may form any of a variety of geometric shapes and configurations. The mouse pad further includes a bevelled or curved region 30 formed on the planar top surface 14.

U.S. Pat. No. 5,451,020 to Smith et al is directed to a wrist rest. Referring to FIG. 1, the wrist rest has a surface layer 10 bonded to an underlying support layer 20. Foam rubber, or sponge rubber, may be used for the support layer. Referring to FIG. 2A, extension pad 2 may be joined with the wrist rest by interlocking contour 100. The extension pad is useful if the keyboard is exceptionally wide or if an auxiliary device, such as a track ball, is positioned next to the keyboard, the typical width for such an extension pad being 6". The interlocking contours can also be used to join a wrist rest to a mouse pad, as in FIG. 4, which shows wrist rest 3 joined to mouse pad 4. This reference states that an advantage of such interlocking pads over a wrist rest formed integrally with a mouse pad is that with the interlock feature, the same wrist rest may be used with either a right-handed or left-handed mouse pad simply by being rotated 180 degrees with the surface remaining face up.

U.S. Pat. No. 3,902,759 to Monteforte et al is directed to a convertible easy chair. Referring to the Figures, cushion members 1–4 are interconnected by joining together their coverings along one horizontally extending corner edge, of the confronting face, of each adjacent cushion member. That is, the cushion members are joined along their respective seam lines. Other joining mechanisms may be employed, such as sewing, lacing, thonging, rings, circular folds, or zippers. In operation, the cushions may be configured or arranged to provide a variety of interlocking structures as shown in FIGS. 1–6. One such structure, shown in FIG. 5, is substantially flat with respect to the underlying surface.

U.S. Pat. No. Design 347,832 to Kaye et al is directed to a roll-up digitizer (mat). Referring to FIGS. 1 and 2, the roll-up digitizer mat is sufficiently flexible so that it may be rolled, as shown in FIG. 1, or alternatively, laid flat as shown in FIG. 2.

U.S. Pat. No. 5,284,099 to Cohen is directed to a table mat. Referring to FIG. 2, the table mat 14 is of rectangular shape having at least one pair of parallel lines of perforations 15 defining a central area 16 for disposition over the table surface 11, as shown in FIG. 1, and the mat has a pair of end areas 17 for folding about the lines of perforations 15, in order to depend downwardly from two sides of the table 10. The mat 14 is provided with two pairs of parallel lines of perforations 15 for selective folding of the end areas 17 to provide a different width for the central area 16. Alternatively, creases or score lines, or the like, may be used in place of perforations. The table mat 14 may have any suitable dimensions. The table mat 14 is made of a heavy paper so as to resist tearing.

One of the reasons for the potential discomfort associated with protracted use of a computer mouse is that the underlying surface, such as a mouse pad, normally has to be flat or supported by a flat underlying surface, such as the top of a desk or table. This requires the user to have to reach out some distance from his body in order to control the mouse on such a flat surface. If the computer pad is brought closer to the user's body, such as on his or her thigh or on the arm of his or her chair, there is tendency of the pad to remain flat, or more importantly there is a tendency of the pad not to remain curved in any selected configuration, such as arched around the curvature of the thigh or the curvature of an arm of a chair. This tendency makes it difficult for the user to control the computer mouse on anything but a flat surface, even though it would be more comfortable and less fatiguing if it were possible for the user to rely on an arched or otherwise contoured underlying surface to control his computer mouse. Based upon the foregoing prior art, it can be seen that there is no prior art which discloses a mouse pad which can be contoured to virtually any shape and then hold that shape indefinitely so that a user may more conveniently and in a less fatiguing manner, control the operation of his or her computer mouse, such as on the arm of his or her chair or on the curvature of his or her thigh or knee or other body portions. Also the pad can bend over the edge of tables and desks to protect and give comfort to the user's wrist. This soft pad will protect the wrist as it presses down on the front edge of the desk.

SUMMARY OF THE INVENTION

The present invention solves the aforementioned deficiency of the prior art and carries one step further the aim of providing a more comfortable and less fatiguing control of a computer mouse by providing a suitably high friction surface which can readily support a computer mouse and permit rotation of the underlying rollerball thereof, while at the same time allowing the surface to be configured in virtually any curved or arched configuration. In the preferred embodiment shown herein, a reconfigurable computer mouse pad is disclosed as comprising a pair of adhesively attached mouse pad material surfaces having mounted therebetween a plurality of plumber strips, the latter comprising elongated, rectangular strips of metal typically made of an aluminum alloy. The combination of mouse pad surfaces and the plumbers' strips sandwiched between them, results in a novel structure of a readily configurable computer mouse pad apparatus which permits the pad to be bent into virtually any desired configuration, including for example, an arched configuration suitable for being mounted on the arm of a chair or on the thigh of a user. The most significant aspect of the present invention is that it comprises a mouse pad that can be configured into any shape and because of the construction thereof, will retain that shape. This feature affords the user of a computer mouse the opportunity to provide a suitable surface therefor on virtually any shape underlying surface, including those which are not flat, but which are curved, such as the arm of a chair or the thigh or other portions of the body of the user.

OBJECTS OF THE INVENTION

It is therefore a principal object of the present invention to provide a reconfigurable computer mouse pad which is readily adapted for use with a computer mouse on virtually any shape underlying surface.

It is an additional object of the present invention to provide a reconfigurable computer mouse pad which may be readily be formed into any non-planar shape, such as for placement on the arm of a chair or on the thigh or kneecap of a user to permit protracted computer mouse operation with less fatigue.

It is still an additional object of the present invention to provide a reconfigurable computer mouse pad comprising a suitable surface material for frictionally engaging the computer mouse rollerball, as well as a plurality of metal strips designed to retain their shape when bent into various non-planar configurations.

BRIEF DESCRIPTION OF THE DRAWINGS

The aforementioned objects and advantages of the present invention, as well as additional objects and advantages thereof, will be more fully understood hereinafter as a result of a detailed description when taken in conjunction with the following drawings in which:

FIG. 1 is a three dimensional view of the present invention illustrating the general structure of a preferred embodiment thereof;

FIG. 2 is a side view of the embodiment shown in FIG. 1;

FIG. 3 is a cross-sectional view of the embodiment shown in FIG. 1 and taken along lines 3—3 thereof;

FIG. 4 is an elevational view of the embodiment shown in FIG. 1 with a top layer of mouse pad material, shown partially removed to expose the interior positioned metal strips thereof; and FIG. 5 is an additional side view of the present invention illustrating the manner in which it may be readily deformed to accommodate non-planar underlying surfaces.

DETAILED DESCRIPTION OF A PREFERRED EMBODIMENT

Referring now to the accompanying figures, it will be seen that a reconfigurable mouse pad 10 in accordance with the present invention, comprises an upper layer 12 and a lower layer 14 between which there are positioned a plurality of metal strips 16. In the preferred embodiment of the invention shown herein, upper layer 12 and lower layer 14 are made of the same material normally used in mouse pads, such as neoprene or other rubber-like material with a relatively high friction surface for ensuring reliable movement of the rollerball on the lower surface of conventional computer mice.

As seen in the accompanying figures, the metal strips 16 are preferrably elongated in a selected direction and are all aligned in that direction in a parallel manner so that the mouse pad 10 may be bent easily along an axis which intersects the metal strips 16. It will be understood that although the metal strips shown herein are rectangular in configuration, other elongated strip configurations are also useable herein. By way of example, the metal strips may be longer and narrower approaching the shape of wire. In addition, they may be oblong or oval in shape. Furthermore, instead of using a plurality of parallel elongated rectangular metal strips, it may be more advantageous to use a unitary metal strip having a circular shape or a plurality of concentrically configured circular metal strips, both of which would tend to permit bending in more than one direction.

In addition to the above alternatives, it should also be noted that the number and spacing between the rectangular metal strip 16 shown in FIG. 1 can be varied considerably. By way of example, it is clear that an alternative configuration may comprise more metal strips spaced closer together, thereby increasing the weight and apparent surface resistance of the pad 10 so that irrespective of the relative position of a computer mouse on top of the upper layer 12 of the pad 10, the mouse is supported by at least one or more such metal strips 16.

It will be also understood that the precise location of the metal strips in regard to the remaining material of the mouse pad 10, may be readily altered. For example, in the present invention, it has been found more aesthetically pleasing and less likely to cause inadvertent damage to an underlying surface, if the metal strips 16 are secured between a pair of layers 12 and 14, such as shown for example in FIG. 4 where the upper layer 12 is partially pulled away from the lower layer 14 to expose the intermediately positioned metal strips 16. However, it will be understood that the present invention may also be accomplished by adhesively connecting the metal strips 16 to the exterior surface of a mouse pad which would still provide the essential structural features of the present invention, but which would be less pleasing aesthetically. The metal strips or their equivalent would be exposed to view and would, in addition, be likely to come in contact with an underlying surface such as the soft surface of a leather armchair which might otherwise be damaged by the metal strips if exposed.

Thus, it will be understood that the principal aspect of the present invention is the combining of a relatively ductile metal device such as the metal strip 16 with an otherwise conventional mouse pad and wherein their combining provides a reconfigurable mouse pad which can be bent to accommodate non-planar underlying surfaces. The metal strips or equivalents thereof provide the mouse pad with a semipermanency of bending. The term semipermanency as used herein means that the bent mouse pad of the present invention will retain its new configuration until it is purposefully bent in another direction to assume another shape or configuration which could include a planar configuration. Thus for example, as shown in FIG. 5, the reconfigurable mouse pad 10 can be bent slightly upward to take on the configuration identified as 10a or it can be bent slightly downward to take on the configuration shown as 10b or it can be bent more radically in an upward curvature to assume to the configuration identified as 10c or it can be bent in a downwardly more radical curvature to assume the position identified in FIG. 5 by the reference 10d. The critical aspect of the present invention is that once bent in accordance with any of the configurations shown in FIG. 5, the reconfigurable mouse pad will hold that shape without any further effort, but nevertheless is readily reshaped when such effort is applied to bend the mouse pad 10 in a different direction or to a different degree of curvature.

Those having skill in the art to which the present invention pertains, will now as a result of the applicant's teaching herein, perceive various modifications and additions which may be made to the invention. Some of these modifications and additions have already been discussed in regard to the number, spacing and shape of the metal strips referred to herein by way of example only. Of course, it will be understood that the precise shape and relative dimensions of the mouse pad layers may also be altered. Thus for example, the mouse pad layers may be provided in other shapes such as circular or oblong, rather than substantially rectangular as shown herein. Furthermore, it will be understood that both the metal strips 16 and the layers 12 and 14 may be made of other materials than those specifically identified herein. By way of example, certain types of deformable plastics may be used to replace the strips 16 and certain types of deformable plastics may be used to replace the layers 12 and 14, all without deviating from the scope of the invention which is intended to be as broad as possible based upon the closest prior art. Accordingly, all such modifications and additions are deemed to be within the scope of the invention which is to be limited only by the claims appended hereto and their equivalents.

I claim:

1. A deformable computer mouse pad comprising:
   at least one layer of flexible, high friction material having a surface on which to position a computer mouse for control of a video display cursor; and
   a plurality of elongated metal strips positioned on a surface of said layer opposite said mouse positioning surface and extending along a majority of the length of said opposite surface for retaining said layer in a selectively bent configuration for overlying an arcuate surface.

2. The mouse pad recited in claim 1 further comprising a second layer of flexible, high friction material overlying said metal strips.

3. A deformable computer mouse pad comprising:
   two layer of flexible, high friction material, one such layer on each side of a layer of metal material;
   the metal material layer having a ductile metal for retaining said flexible layers in a selectively bent configuration for overlying an arcuate surface.

4. The mouse pad recited in claim 3 wherein said metal material layer comprises a plurality of elongated metal strips.

5. The mouse pad recited in claim 3 wherein said metal material layer comprises at lease one continuous path of ductile metal distributed over at least a significant portion of said pad.

6. A deformable computer mouse pad comprising:
   at least one layer of flexible, high friction material; and
   at least one layer of predominantly ductile metal material;
   said layers being contiguous for retaining said pad in a selectively arched configuration for overlying an arcuate surface.

* * * * *